United States Patent [19]

Fiore et al.

[11] Patent Number: 5,032,673

[45] Date of Patent: Jul. 16, 1991

[54] LIQUID-CRYSTAL COPOLYETHERS BASED ON 7-OXA-BICYCLO-(2,2,1)-HEPTANE

[75] Inventors: Leonardo Fiore, Milan; Giuseppe Motroni, Novara; Mauro Maritano, Como, all of Italy

[73] Assignee: Montedison S.p.A., Milan, Italy

[21] Appl. No.: 348,567

[22] Filed: May 8, 1989

Related U.S. Application Data

[63] Continuation of Ser. No. 95,596, Sep. 11, 1987, Pat. No. 4,874,838.

[30] Foreign Application Priority Data

Sep. 15, 1986 [IT] Italy ................. 21697 A/86

[51] Int. Cl.$^5$ ............... C08G 65/16; C08G 65/18; C08G 65/20
[52] U.S. Cl. ................... 528/417; 528/408; 528/409; 528/412
[58] Field of Search ........................... 528/417

[56] References Cited

U.S. PATENT DOCUMENTS

| | | | |
|---|---|---|---|
| 2,764,559 | 9/1956 | Wilkins | 528/417 |
| 2,856,370 | 10/1958 | Muetterties | 528/417 |
| 3,205,207 | 9/1965 | Vandenberg | 528/417 |
| 3,344,088 | 9/1967 | Miller | 528/417 |
| 3,393,157 | 7/1968 | Janssen et al. | 528/417 |
| 3,417,033 | 12/1968 | Weissermel et al. | 528/417 |
| 4,371,713 | 2/1983 | Matsumoto et al. | 568/614 |

FOREIGN PATENT DOCUMENTS

| | | |
|---|---|---|
| 1745044 | 9/1975 | Fed. Rep. of Germany . |
| 61-143428 | 7/1986 | Japan . |
| 449975 | 4/1968 | Switzerland . |

OTHER PUBLICATIONS

*Polymerization of Bicyclic Ethers. NMR Structure Study of Copolymers of 7–Oxabicyclo[2.21]Heptane with Ethylene Oxide*, 6019 Macromolecules, vol. 15 (1982), May–Jun., No. 3, Washington, U.S.A., pp. 835–840.

*Liquid Crystals Polyethers Obtained from Endo– and Exo-2-Methyl-7-Oxabicyclo[2.2.1]Heptane*, 2445 Polymer Bulletin 16 (1986), Dec., No. 6, pp. 507–511.

*Syntheses and Ring–Opening Polymerization of 2,3– and 2,5–Dimethyl-7-Oxabicyclo[2.2.1]Heptanes*, Polymer Journal, vol. II, pp. 113–122 (1979).

*Primary Examiner*—John Kight, III
*Assistant Examiner*—Frederick Krass
*Attorney, Agent, or Firm*—Stevens, Davis, Miller & Mosher

[57] ABSTRACT

The present invention relates to copolyethers constituted by copolymers of 7,oxa-bicyclo(2,2,1)heptane, and its alkyl-derivatives, with one or more cycloaliphatic ethers, comprising from 2 to 4 carbon atoms in their ring.

These copolyethers show an anisotropic behavior in the molten state, and therefore are endowed with liquid-crystal properties.

5 Claims, No Drawings

LIQUID-CRYSTAL COPOLYETHERS BASED ON 7-OXA-BICYCLO-(2,2,1)-HEPTANE

This is a Continuation of application Ser. No. 095,596, filed Sept. 11, 1987, now U.S. Pat. No. 4,874,838.

FIELD OF THE INVENTION

The present invention relates to liquid-crystal copolyethers, and to a process to prepare them.

More precisely, it relates to copolymers of 7,oxa-bicyclo(2,2,1)heptane having the formula:

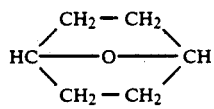

or its derivatives substituted in 2-, 3-, 5-, 6-positions with alkyl radicals having a low number of carbon atoms, with a particular class of cyclophatic ethers.

BACKGROUND OF THE INVENTION

The homopolymer of 7,oxa-bicyclo(2;2;1)heptane and of its alkyl-derivatives is known and described in the technical literature. This homopolymer, although shows a crystallinity at X-rays, and is poorly soluble in most common solvents, suffers from the drawback that it has a melting temperature (generally higher than 350° C.) higher than its decomposition temperature. This set of properties make the homopolymer not much interesting from a industrial viewpoint, due to the fabricating difficulties.

THE PRESENT INVENTION

The present Applicant found now that by copolymerizing 7,oxa-bicyclo(2,2,1)heptane of formula (I), or an alkyl-derivative thereof, with particular comonomers, it is possible to obtain copolymers which, besides having a melting point controlled by the amount and type of used comonomer, surprisingly show an anisotropic behaviour in the molten state, and hence display a liquid-cristal behaviour.

It is known that the polymers endowed with such a behaviour show, in the molten state, and within a defined temperature range, an ordered arrangement of the molecular chains, which is maintained in the solid state, securing to the solid polymer special properties, such as a high elastic modulus, a high tensile stress and, in general, the typical properties of a fibre-reinforced polymer.

It was furthermore found that the copolymers in question show a high cristallinity, which gives the polymer advantageous properties, such as a lower heat distorsion, and a higher resistance to the attack by solvents.

Therefore, the object of the present invention are the copolyethers endowed with an anisotropic behaviour in the molten state, constituted by copolymers of 7,oxa-bicyclo(2,2,1)heptane, or its derivatives substituted in 2-, 3-, 5-, 6-positions with alkyl radicals having a small number of carbon atoms, with one or more cycloaliphatic ether(s) containing from 2 to 4 carbon atoms, selected from those having the general formula:

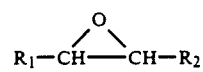

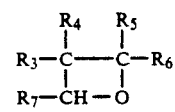

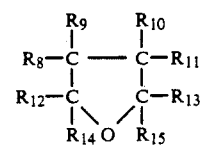

wherein:

$R_1$, $R_2$, equal to, or different from, each other, represent H, a halogen, an alkyl radical containing a small number of carbon atoms, possibly halogen-substituted, a phenyl or a substituted phenyl radical, and wherein $R_3$, $R_4$, $R_5$, $R_6$, $R_7$, $R_8$, $R_9$, $R_{10}$, $R_{11}$, $R_{12}$, $R_{13}$, $R_{14}$, and $R_{15}$, equal to, or different from each other, represent H, a halogen, an alkyl radical containing a small number of carbon atoms, possibly halogen-substituted, with the condition that at least one of radicals $R_{12}$, $R_{13}$, $R_{14}$, and $R_{15}$ is hydrogen.

By the term "alkyl radicals containing a small number of carbon atoms", as used in the present specification and in the appended claims, alkyl radicals are meant, which contain from 1 to 4 carbon atoms.

Cycloaliphatic ethers having the general formula (II), (III) and (IV), wherein $R_1$, $R_2$, $R_3$, $R_4$, $R_5$, $R_6$, $R_7$, $R_8$, $R_9$, $R_{10}$, $R_{11}$, $R_{12}$, $R_{13}$, $R_{14}$, and $R_{15}$ are H, Cl, F, $CH_3$, $C_2H_5$, $CH_2Cl$, $CH_2F$, $CF_3$ and $C_2F_5$, are preferred.

The copolyether of the present invention is preferably constituted by bicyclo(2,2,1)heptane, or an alkyl-derivative thereof, with one cycloaliphatic ether of formula (II), (III), (IV) only.

The cycloaliphatic ethers are generally present in the copolymer in molar amounts comprised within the range of from 0.1 to 50%, and preferably of from 2 to 20%, relatively to the total of the monomers.

In general, the copolyethers of the present invention have an inherent viscosity of at least 0.1 dl/g. Inherent viscosities comprised within the range of from 0.3 to 5 dl/g are preferred.

The inherent viscosity is measured at 30° C. in phenol/tetrachloroethane (60/40 by volume) at the concentration of 2.5 g/l.

The copolyethers of the present invention can be prepared according to any known processes, and, in particular, by reacting 7,oxa-bicyclo(2,2,1)heptane, or an alkyl-derivative thereof, with the cycloaliphatic ether(s), in the presence of a cationic polymerization catalyst. Particularly suitable are the Lewis acids, such as $BF_3$, $BF_3$ complexed with electron donors (e.g., ethyl ether), pure $FeCl_3$, or $FeCl_3$ in the presence of activators (e.g., $SOCl_2$), $SnCl_4$ and $HClO_4$, etc.

The catalyst is generally present in catalytic amounts comprised within the range of from 0.0001 to 1%, and preferably of from 0.001 to 0.5%, by weight, relatively to the monomers.

The monomers and the reaction environment are preferably anhydrous, or substantially anhydrous.

The polymerization is preferably carried out in the absence of solvents. In case solvents are used, there can be used, e.g., hydrocarbons (such as benzene or cyclohexane), chlorinated hydrocarbons (such as methylene chloride), or nitroarenes (such as nitrobenzene).

The polymerization temperature is generally comprised within the range of from −20° C. to 120° C., and preferably of from 0° C. to 60° C.

The copolyethers being the subject-matter of the present invention have liquid-crystal properties, and are particularly suitable for use blended with thermoplastic resins to improve such mechanical properties thereof, as the elastic modulus, the tensile strength, and so forth.

Thermoplastic resins which are particularly suitable for this purpose are the thermoplastic polyester resins, ABS resins, polycarbonates, and so forth.

Therefore, a further object of the present invention are the bodies based on the above-said copolyethers, fabricated under such conditions as to take advantage of the properties deriving from the liquid-crystal state.

The following example is supplied for illustrative purposes, and is not to be construed as being anyway limitative of the invention.

EXAMPLE 1

7,oxa-bicyclo(2,2,1)heptane was purified by refluxing and subsequent distillation over LiAlH$_4$, under a nitrogen atmosphere.

99.7%-pure oxacyclopropane was furthermore distilled. To a glass ampoule, which was previously dried and cooled with liquid nitrogen, the following reactants were charged under a nitrogen atmosphere:

| | |
|---|---|
| 7,oxa-bicyclo(2,2,1)heptane | 5 ml |
| oxacyclopropane | 0.3 ml |
| BF$_3$.Et$_2$O (solution in ether at 20% by volume) | 0.10 ml |

The ampoule is then sealed by welding under high vacuum, is heated to 0° C. and the contents thereof are kept stirred by magnetic stirring at 0° C. for 4 hours.

The polymerization was quenched with an equal volume of methanol, containing 1% by volume of NH$_4$OH. The polymer, ground into a powder form, was repeatedly washed with a 20/5/0.5 (by volume) methylene chloride/methanol/NH$_4$OH mixture.

In such a way, after drying at 50° C. in vacuo, 4.1 g (yield: 80%) was obtained of a polymer as a white powder.

At X-ray analysis the polymer resulted crystalline, and had an inherent viscosity of 1.2 dl/g (measured at the concentration of 2.5 g/l in phenol/tetrachloroethane (60/40 by volume) at 30° C.).

Observations by the optical microscope under polarized light between crossed prisms showed the presence of birefringence of the molten material at temperatures higher than the melting temperature, thus confirming the liquid-crystal characteristics of the polymer.

EXAMPLE 2

Epichlorohydrin was purified by storing over activeted molecular sieves and subseguent distillation under nitrogen.

To a 50 ml glass reactor, previously dried and with nitrogen atmosphere the following reactants were charged:

| | |
|---|---|
| 7-oxa-bicyclo (2,2,1)-heptane | 5,0 ml |
| Epichlorohydrin | 0,43 ml |
| PF$_5$ (0,54M solution in 1,2-dichloroethane/ether 3:1 v/v) | 0,34 ml |

The reaction mixture was stirred at 0° C. for 24 hours while maintaining a dry nitrogen atmosphere. The polymerization was quenched and the polymer worked-out as described in example 1.

The polymer, 5,04 g (yield 96%) of white powdery material, had inherent viscosity 0.50 dl/g (0.1% solution in m-cresol at 25° C.) and was crystalline at x ray examination.

The DSC trace showed a crystalline melting peak at 152° C. (fusion enthalpy 21 J/g) with crystallization peak at 141° C., observations on the hot stage microscope between crossed polarizers showed birifrigence up to 300° C.

What is claim is:

1. Copolyethers displaying anisotropic liquid-crystal properties in the molten state consisting of copolymers of 7-oxa-bicyclo(2,2,1)heptane, optionally substituted in the 2-, 3-, 5- and/or 6-positions with alkyl radicals having 1 or 2 carbon atoms, with one or more single ring cycloaliphatic ether(s) containing 3 carbon atoms in their ring, selected from the group consisting of those having the formula:

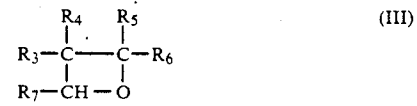

wherein R$_3$, R$_4$, R$_5$, R$_6$ and R$_7$ are equal to or different from each other and represent H, halogen, or an alkyl radical having 1 or 2 carbon atoms in which one or more hydrogen atoms are optionally replaced by halogens, and wherein the 7-oxa-bicyclo(2,2,1)heptane is present in a molar amount from 80 to 98% in said copolyethers.

2. Copolyethers according to claim 1, wherein R$_3$, R$_4$, R$_5$, R$_6$ and R$_7$ are H, CH$_3$, C$_2$H$_5$ or any combinations thereof.

3. Copolyethers according to claim 1, having an intrinsic viscosity in 60/40 (by volume) phenol/tetrachloroethane, of at least 0.1 dl/g.

4. Process for preparing the copolyethers according to claim 1, comprising reacting 7,oxa-bicyclo(2.2.1)heptane with the cyclic ethers having the general formula (III) in the presence of a cationic polymerization catalyst.

5. Copolyethers according to claim 1, having an intrinsic viscosity in 60/40 (by volume) phenol/tetrachlorethane, of from 0.3 to 5 dl/g.

* * * * *